(12) United States Patent
Fleischhaker et al.

(10) Patent No.: US 8,461,296 B2
(45) Date of Patent: Jun. 11, 2013

(54) METHOD FOR MECHANICAL STABILIZATION OF NITROGEN-CONTAINING POLYMERS

(75) Inventors: Friederike Fleischhaker, Ludwigshafen (DE); Oliver Gronwald, Frankfurt (DE); Jörg Belack, Skillman, NJ (US)

(73) Assignee: BASF SE (DE)

( * ) Notice: Subject to any disclaimer, the term of this patent is extended or adjusted under 35 U.S.C. 154(b) by 0 days.

(21) Appl. No.: 13/428,074

(22) Filed: Mar. 23, 2012

(65) Prior Publication Data

US 2012/0252909 A1    Oct. 4, 2012

Related U.S. Application Data

(60) Provisional application No. 61/466,957, filed on Mar. 24, 2011.

(51) Int. Cl.
*C08F 6/00*    (2006.01)
*C08G 64/00*    (2006.01)

(52) U.S. Cl.
USPC .............................. 528/493; 429/479; 521/27

(58) Field of Classification Search
USPC .............................. 429/479; 521/27; 528/493
See application file for complete search history.

(56) References Cited

U.S. PATENT DOCUMENTS

| 2004/0118773 A1 | 6/2004 | Uensal et al. |
| 2004/0131909 A1 | 7/2004 | Soczka-Guth et al. |
| 2005/0256296 A1 | 11/2005 | Kiefer et al. |
| 2008/0050514 A1 | 2/2008 | Calundann et al. |
| 2011/0311901 A1* | 12/2011 | Fleischhaker et al. ........ 429/482 |
| 2012/0231365 A1* | 9/2012 | Gronwald et al. ............ 429/479 |

FOREIGN PATENT DOCUMENTS

| DE | 10052242.4 | 5/2002 |
| EP | 1337319 A1 | 8/2003 |
| WO | WO-96/13872 A1 | 5/1996 |
| WO | WO-00/44816 A1 | 8/2000 |
| WO | WO-02070592 A2 | 9/2002 |
| WO | WO-02088219 A1 | 11/2002 |
| WO | WO-2004/024797 A1 | 3/2004 |

* cited by examiner

*Primary Examiner* — Terressa Boykin

(74) *Attorney, Agent, or Firm* — Novak Druce Connolly Bove + Quigg LLP

(57) ABSTRACT

The invention relates to a process for preparing mechanically stabilized polyazole polymers. The process includes the steps of: a) producing a film comprising polyazoles with at least one amino group in a repeat unit, b) treating the film from step a) with a solution comprising (i) at least one acid and (ii) at least one stabilizing reagent, and c) performing the stabilization reaction in the membrane obtained in step directly or in a subsequent membrane processing step by heating to a temperature greater than 60° C. The stabilizing reagent contains at least one compound which has at least one aldehyde group and at least one hydroxyl group; or at least one hemiacetal group; or at least one acetal group. These polyazole polymer membranes have a high conductivity and a good mechanical stability and are suitable for applications in fuel cells.

16 Claims, 1 Drawing Sheet

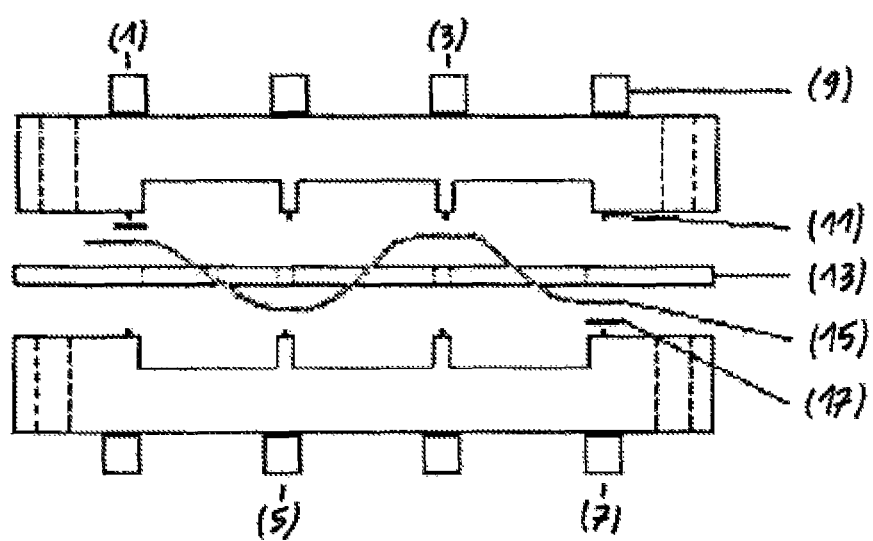

METHOD FOR MECHANICAL STABILIZATION OF NITROGEN-CONTAINING POLYMERS

CROSS-REFERENCE TO RELATED APPLICATIONS

This application claims benefit (under 35 USC 119(e)) of U.S. Provisional Application 61/466,957, filed Mar. 24, 2011, which is incorporated by reference.

BACKGROUND OF THE INVENTION

The present invention relates to a process for mechanically stabilizing nitrogen-containing polymers by reaction with suitable reagents and to the use of materials stabilized in such a way in polymer electrolyte membranes (PEMs), membrane electrode assemblies (MEAs) and PEM fuel cells.

Polymer electrolyte membranes (PEMs) are already known and are especially used in fuel cells. Frequently, sulfonic acid-modified polymers, especially perfluorinated polymers, are employed. A prominent example thereof is Nafion™ from DuPont de Nemours, Willmington USA. For proton conduction, a relatively high water content in the membrane is required, which is typically 4-20 molecules of water per sulfonic acid group. The necessary water content, but also the stability of the polymer in conjunction with acidic water and the hydrogen and oxygen reaction gases, limits the operating temperature of the PEM fuel cell stack typically to 80-100° C. Under pressure, the operating temperature can be increased to >120° C. Otherwise, higher operating temperatures cannot be achieved without a loss in performance of the fuel cell.

For system reasons, however, higher operating temperatures than 100° C. in the fuel cell are desirable. The activity of the noble metal-based catalysts present in the membrane electrode assembly (MEA) is significantly better at high operating temperatures. More particularly, in the case of use of what are called reformates from hydrocarbons, distinct amounts of carbon monoxide are present in the reformer gas, which typically have to be removed by complex gas treatment or gas purification. At high operating temperatures, the tolerance of the catalysts to the CO impurities rises up to several % by volume of CO.

In addition, heat evolves in the operation of fuel cells. Cooling of these systems to below 80° C. can, however, be very costly and inconvenient. According to the power output, the cooling apparatuses can be made much simpler. This means that, in fuel cell systems which are operated at temperatures above 100° C., the waste heat can be utilized much better, and hence the fuel cell system efficiency can be enhanced by power-heat coupling.

In order to attain these temperatures, membranes with novel conductivity mechanisms are generally used. One approach for this purpose is the use of membranes which exhibit electrical conductivity without the use of water. A first development in this direction is detailed, for example, in WO 96/13872. For instance, WO 96/13872 discloses the use of acid-doped polybenzimidazole membranes which are produced by a casting process.

A new generation of acid-containing polyazole membranes which likewise exhibit electrical conductivity without the use of water is described in WO 02/088219. The acid-containing polyazole membranes disclosed in WO 02/088219 already exhibit a favorable profile of properties.

Due to the intended applications of PEM fuel cells, however, the mechanical properties of the acid-containing polyazole membranes are in need of constant improvement. For instance, such membranes are still relatively soft and therefore have only limited mechanical durability, and mechanical stability decreases with rising temperature, which can already lead to stability problems in the upper range of the typical operating window (approx. 160° C.-180° C.). It is therefore desirable to improve the mechanical properties, especially the membrane stability, with simultaneously high conductivity.

Mechanical stabilization by bridging or crosslinking reactions is already sufficiently well known in polymer technology. However, a problem here is that, even when a polymer itself has sufficient mechanical stability, it may be the case that the mechanical stability of the polymer, as a result of impregnation/doping with a strong acid for the purpose of imparting proton conductivity, decreases to an inadequate degree.

First approaches for improvement of the mechanical stability of acid-containing polyazole membranes can be found in WO 00/44816 and WO 02/070592. This involves first preparing solutions of the polyazole polymer in an aprotic, polar, organic solvent, and providing the solution with a bridging reagent. After formation of a film, the organic solvent is removed and the bridging reaction is carried out. Subsequently, the film is doped with a strong acid and used. The acid-containing polyazole membranes obtained exhibit an improved mechanical stability compared to unbridged acid-containing polyazole membranes, with simultaneously good conductivity.

However, it has been found that, with the aid of the methods known to date, bridging or crosslinking of polyazole polymers is possible, but the use of aprotic, polar, organic solvents gives rise to new limits. High molecular weight polyazole polymers in particular are only of limited solubility or are insoluble in the aforementioned organic solvents, and thus cannot be processed.

In addition, in situ crosslinking of acid-containing polyazole membranes constitutes a particular challenge because the conventional crosslinkers have already been depleted or form adducts in an acid environment, especially in phosphoric acid.

It was therefore an object of the present invention to indicate better options for mechanical stabilization of acid-containing polyazole membranes based on polyazole polymers. In addition, the good profiles of properties of acid-containing polyazole membranes were to be maintained or even improved, especially with regard to the conductivity. In addition, the membranes were to be producible at minimum expense in a comparatively simple manner.

These and further objects which are immediately evident from the connections discussed above are achieved by a process having all features of the present claim 1. The dependent claims describe particularly appropriate variants of the process. In addition, membranes and membrane electrode assemblies obtainable by the process, and the use thereof in fuel cells, are protected.

The present invention provides a process for preparing mechanically stabilized polyazole polymers, comprising the following steps:

a) producing a film comprising polyazoles with at least one amino group in a repeat unit,
b) treating the film from step a) with a solution comprising (i) at least one strong acid and (ii) at least one stabilizing reagent, the total content of stabilizing reagents in the solution being in the range from 0.01 to 30% by weight, preferably 0.1 to 20% by weight, and more preferably 0.5 to 10% by weight, and the total amount of stabilizing reagent based on the polyazole present in the film preferably being in the range from 20 to 80 mol %, c) performing the stabilization reaction in the membrane obtained in step b) directly or in a subsequent membrane processing step, especially in a PEM fuel cell, e.g. a membrane electrode assembly, by heating to a temperature greater than 60° C., d) optionally additionally doping the membrane obtained in step c) with a strong acid or concentrating the strong acid present by removing water present, said stabilizing reagent comprising at least one compound which has A) at least one aldehyde group and at least one hydroxyl group or
B) at least one hemiacetal group or
C) at least one acetal group.

A BRIEF DESCRIPTION OF THE FIGURE

FIG. 1 illustrates the sample according to the invention being appropriately fixed in the test cell.

With the aid of the above method, acid-containing and proton-conducting polyazole membranes based on stabilized high molecular weight polyazole polymers are obtainable for the first time. The high molecular weight polyazole polymers known to date were unstabilized; the polyazole polymers which have been modified by bridging and/or crosslinking and are known to date do not include high molecular weight polyazole polymers.

In addition, it is possible with the aid of the above method, for the first time, to obtain acid-containing, proton-conducting, high molecular weight polyazole polymers which have an improved modulus of elasticity and improved elongation at break. Both properties are of great significance especially for use as polymer electrolyte membranes for fuel cells.

Furthermore, the conductivities of the inventive membranes are exceptionally high. The inventive stabilization of the membrane in solution leads especially to a higher conductivity than the stabilization of the same membrane under air or a gas atmosphere.

In addition, the inventive procedure allows extremely efficient in situ crosslinking of acid-containing polyazole membranes because the stabilizing reagent is neither depleted prior to the stabilization reaction nor inactivated by adduct formation.

Finally, the process according to the invention is performable on the industrial scale and inexpensively in a comparatively simple manner.

Film Comprising Polyazoles

Polyazoles in the context of the present invention are understood to mean those polymers in which the repeat unit in the polymer comprises preferably at least one aromatic ring with at least one nitrogen atom. The aromatic ring is preferably a five- or six-membered ring with one to three nitrogen atoms, which may be fused to another ring, especially another aromatic ring. Individual nitrogen heteroatoms may also be replaced by oxygen, phosphorus and/or sulfur atoms. The heterocyclic aromatic rings are preferably in the main polymer chain, but may also be in the side chain. Particular preference is given to those basic polymers which, in the repeat unit, comprise unsaturated five-membered or six-membered aromatic units which comprise, in the ring, 1 to 5 nitrogen atoms or, as well as nitrogen atoms, one or more other heteroatoms.

The inventive polyazoles have at least one amino group in a repeat unit. The amino group may be present as a primary amino group ($NH_2$ group), as a secondary amino group (NH group) or as a tertiary group, which is either part of a cyclic, optionally aromatic structure or part of a substituent on the aromatic unit.

Due to the amino group in the repeat unit, the polymer is basic, and the repeat unit can react preferentially via the amino group with the stabilizing reagent. In view of the reactivity toward the stabilizing reagent, the amino group in the repeat unit is preferably a primary or secondary amino group, more preferably a cyclic secondary amino group, which appropriately forms part of the ring of the azole repeat unit.

The production of a film or of a foil comprising polyazoles is already known. The preparation is effected, for example, as described in WO 2004/024797 and comprises the steps of:

A) mixing one or more aromatic tetraamino compounds with one or more aromatic carboxylic acids or esters thereof which contain at least two acid groups per carboxylic acid monomer, or mixing one or more aromatic and/or heteroaromatic diaminocarboxylic acids, in polyphosphoric acid to form a solution and/or dispersion, B) applying a layer using the mixture from step A) to a support, C) heating the flat structure/layer obtainable according to step B) under inert gas to temperatures of up to 350° C., preferably up to 280° C., more preferably up to 250° C., to form the polyazole polymer, D) hydrolyzing the polymer film formed in step C) (until it is self-supporting), E) detaching the polymer film formed in step D) from the support, F) removing the polyphosphoric acid or phosphoric acid present and drying.

The aromatic and heteroaromatic tetraamino compounds used in accordance with the invention are preferably 3,3',4,4'-tetraaminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetraaminobenzophenone, 3,3',4,4'-tetraaminodiphenylmethane and 3,3',4,4'-tetraaminodiphenyldimethylmethane and salts thereof, especially the mono-, di-, tri- and tetrahydrochloride derivatives thereof.

The aromatic carboxylic acids used in accordance with the invention are dicarboxylic acids and tricarboxylic acids and tetracarboxylic acids, or the esters thereof or the anhydrides thereof or the acid chlorides thereof. The term "aromatic carboxylic acids" likewise also comprises heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid, or the C1-C20-alkyl esters or C5-C12-aryl esters thereof or the acid anhydrides thereof or the acid chlorides thereof. The aromatic tri-, tetracarboxylic acids or the C1-C20-alkyl esters or C5-C12-aryl esters thereof or the acid anhydrides thereof or the acid chlorides thereof are preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid.

The aromatic tetracarboxylic acids or the C1-C20-alkyl esters or C5-C12-aryl esters thereof or the acid anhydrides thereof or the acid chlorides thereof are preferably 3,5,3',5'-biphenyltetracarboxylic acid, benzene-1,2,4,5-tetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used in accordance with the invention are heteroaromatic dicarboxylic acids and tricarboxylic acids and tetracarboxylic acids, or the esters thereof or the anhydrides thereof. Heteroaromatic carboxylic acids are understood to mean aromatic systems which contain at least one nitrogen, oxygen, sulfur or phosphorus atom in the aromatic ring. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also the C1-C20-alkyl esters or C5-C12-aryl esters thereof, or the acid anhydrides thereof or the acid chlorides thereof.

The content of tricarboxylic acid or tetracarboxylic acid (based on the dicarboxylic acid used) is between 0 and 30 mol %, preferably 0.1 and 20 mol %, especially 0.5 and 10 mol %.

The aromatic and heteroaromatic diaminocarboxylic acids used in accordance with the invention are preferably diaminobenzoic acid and the mono- and dihydrochloride derivatives thereof.

Preferably, in step A), mixtures of at least 2 different aromatic carboxylic acids are used. Particular preference is given to using mixtures which comprise, as well as aromatic carboxylic acids, also heteroaromatic carboxylic acids. The mixing ratio of aromatic carboxylic acids to heteroaromatic carboxylic acids is between 1:99 and 99:1, preferably 1:50 to 50:1.

These mixtures are especially mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The polyphosphoric acid used in step A) comprises commercial polyphosphoric acids as obtainable, for example, from Riedel-de Haen. The polyphosphoric acids $H_{n+2}P_nO_{3n+1}$ (n>1) typically have a content, calculated as $P_2O_5$ (by acidimetric means) of at least 83%. Instead of a solution of the monomers, it is also possible to produce a dispersion/suspension.

The mixture obtained in step A) has a weight ratio of polyphosphoric acid to the sum of all monomers of 1:10 000 to 10 000:1, preferably 1:1000 to 1000:1, especially 1:100 to 100:1.

The layer is formed in step B) by means of measures known per se (casting, spraying, knife-coating), which are known from the prior art for polymer film production. Suitable supports are all supports which can be described as inert under the conditions. In addition to these inert supports, however, other supports are also suitable, for example polymer films, wovens and nonwovens, which bond with the layer formed in step B) and form a laminate. To adjust the viscosity, phosphoric acid (conc. phosphoric acid, 85%) can optionally be added to the solution. This can adjust the viscosity to the desired value and facilitate the formation of the membrane. The layer obtained in step B) has a thickness matched to the subsequent use and is not subject to any restriction. Typically, the layer formed has a thickness between 1 and 5000 μm, preferably between 1 and 3500 μm, especially between 1 and 100 μm.

The polyazole-based polymer formed in step C) comprises repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV)

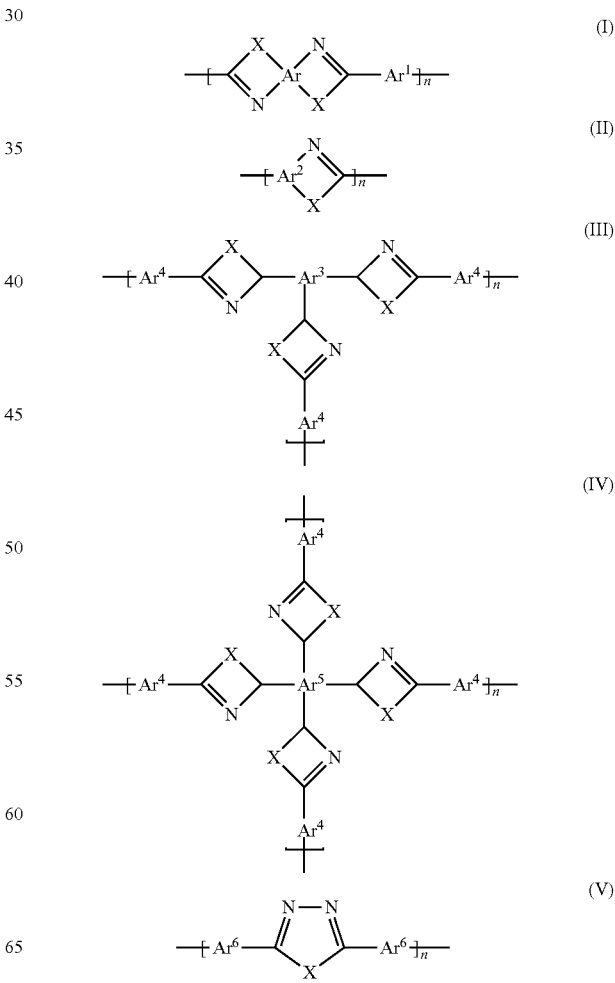

-continued

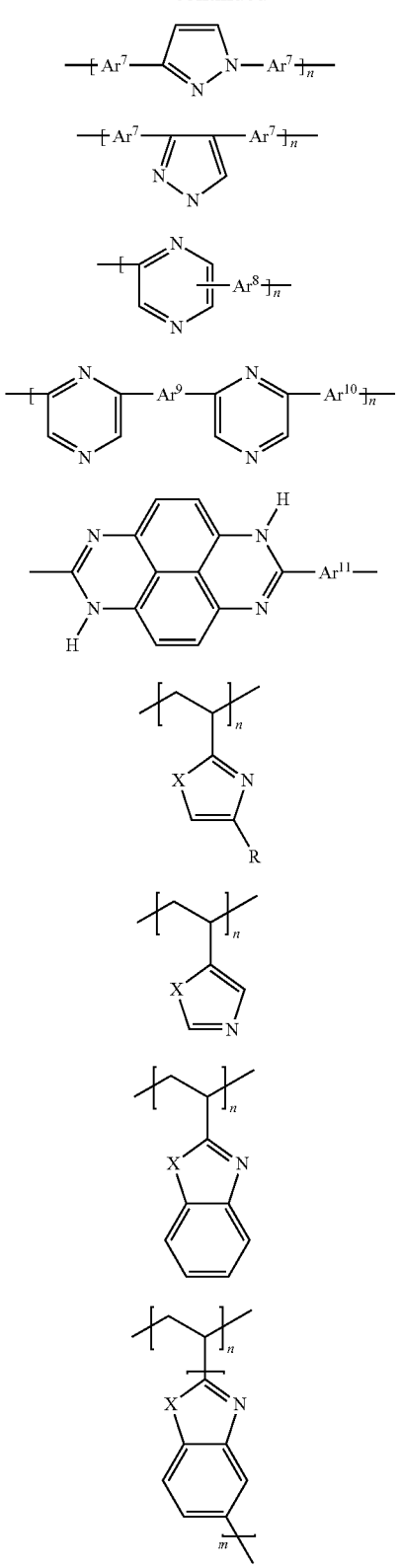

in which

Ar are the same or different and are each a tetravalent aromatic or heteroaromatic group which may be mono- or polycyclic, $Ar^1$ are the same or different and are each a divalent aromatic or heteroaromatic group which may be mono- or polycyclic, $Ar^2$ are the same or different and are each a di- or trivalent aromatic or heteroaromatic group which may be mono- or polycyclic, $Ar^3$ are the same or different and are each a trivalent aromatic or heteroaromatic group which may be mono- or polycyclic, $Ar^4$ are the same or different and are each a trivalent aromatic or heteroaromatic group which may be mono- or polycyclic, $Ar^5$ are the same or different and are each a tetravalent aromatic or heteroaromatic group which may be mono- or polycyclic, $Ar^6$ are the same or different and are each a divalent aromatic or heteroaromatic group which may be mono- or polycyclic, $Ar^7$ are the same or different and are each a divalent aromatic or heteroaromatic group which may be mono- or polycyclic, $Ar^8$ are the same or different and are each a trivalent aromatic or heteroaromatic group which may be mono- or polycyclic, $Ar^9$ are the same or different and are each a di- or tri- or tetravalent aromatic or heteroaromatic group which may be mono- or polycyclic, $Ar^{10}$ are the same or different and are each a di- or trivalent aromatic or heteroaromatic group which may be mono- or polycyclic, $Ar^{11}$ are the same or different and are each a divalent aromatic or heteroaromatic group which may be mono- or polycyclic, X is the same or different and is oxygen, sulfur or an amino group which bears a hydrogen atom, a group having 1-20 carbon atoms, preferably a branched or unbranched alkyl or alkoxy group, or an aryl group as further radical, R is the same or different and is hydrogen, an alkyl group or an aromatic group, and n, m are each an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetraazapyrenes).

In a further embodiment of the present invention, the polymer comprising repeat azole units is a copolymer or a blend which comprises at least two units of the formulae (I) to (XIV) which differ from one another. The polymers may be in the form of block copolymers (diblock, triblock), random copolymers, periodic copolymers and/or alternating polymers.

In a particularly preferred embodiment of the present invention, the polymer comprising repeat azole units is a polyazole which comprises only units of the formulae (I) and/or (II).

The number of repeat azole units in the polymer is preferably an integer greater than or equal to 10. Particularly preferred polymers comprise at least 100 repeat azole units.

In the context of the present invention, preference is given to polymers comprising repeat benzimidazole units. Some examples of the highly appropriate polymers comprising repeat benzimidazole units are represented by the following formulae:

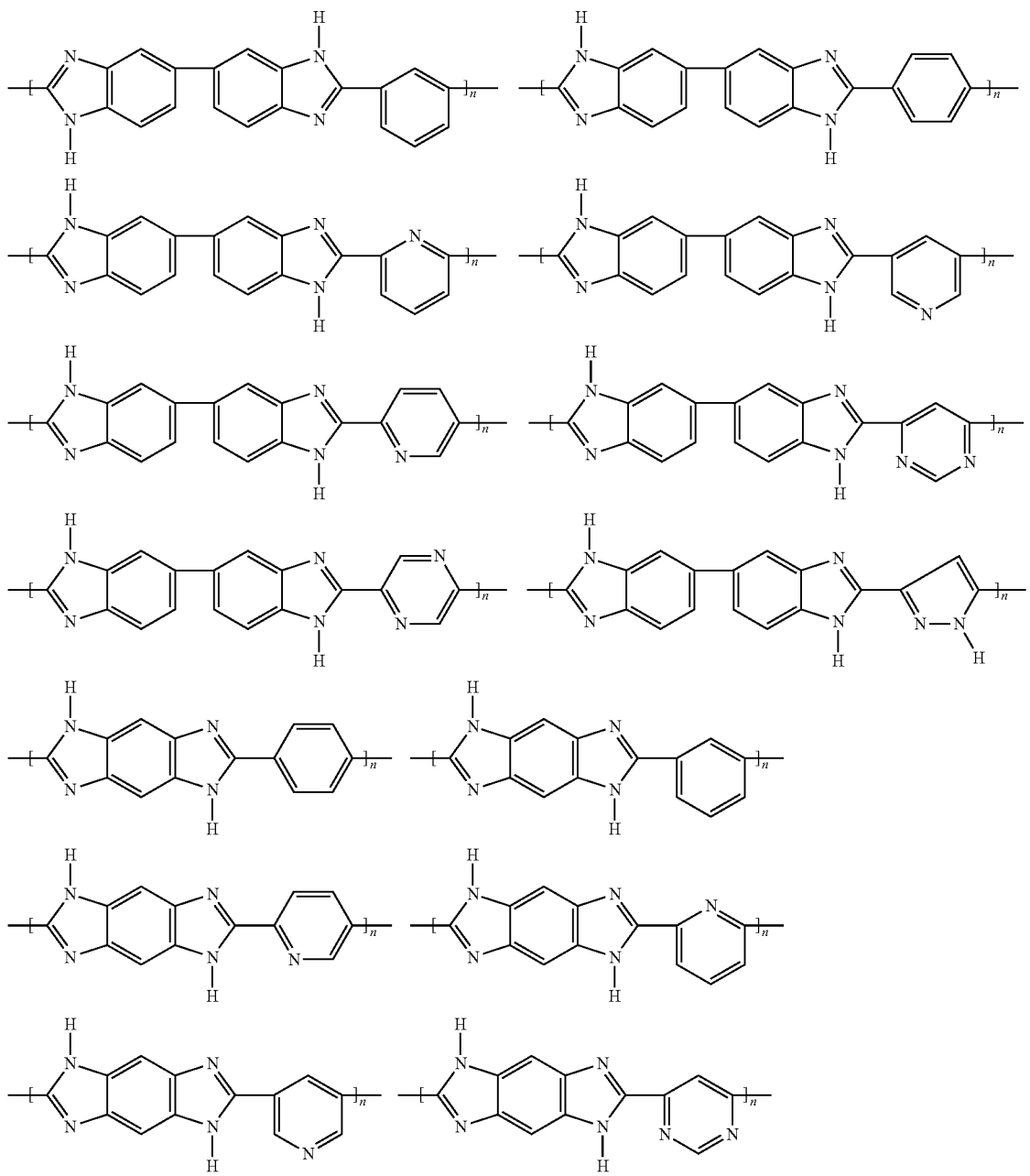

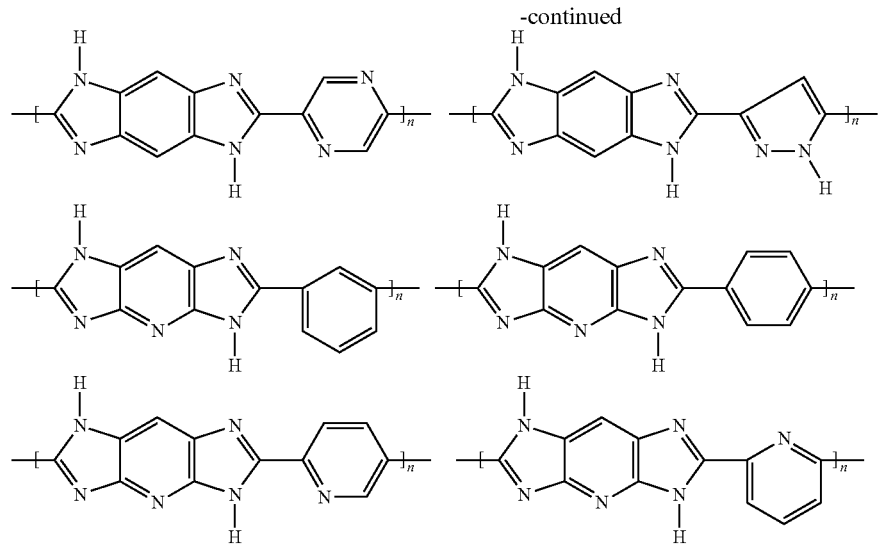
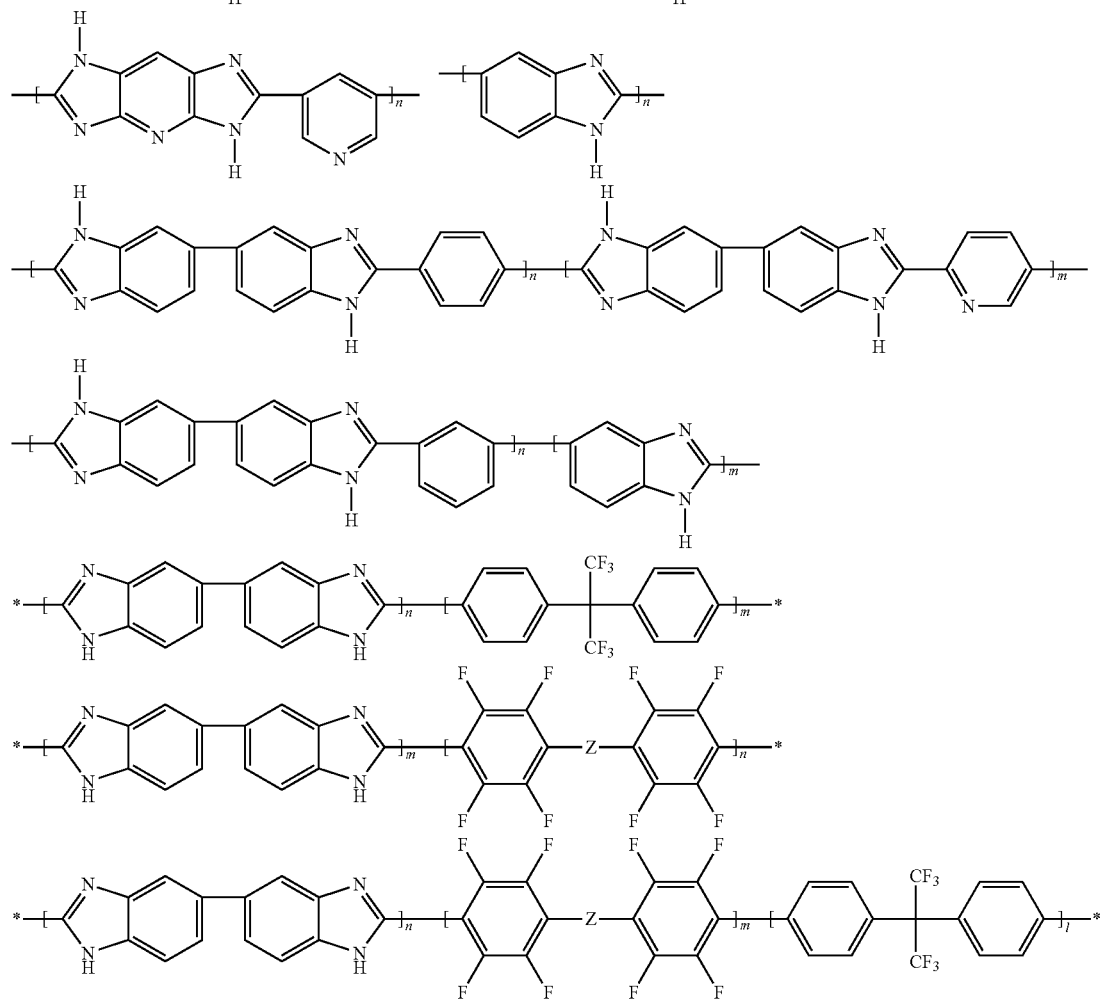

In the last formula, the azole units and the two fluorinated components may be joined to one another in any sequence. The preparation can be effected as a polymer, random copolymer or block copolymer.

In addition, n and m in the above formulae may each independently be an integer greater than or equal to 10, preferably greater than or equal to 100.

The inventive procedure is suitable in principle for all polyazoles irrespective of molecular weight. However, it has been found to be particularly useful for the stabilization of high molecular weight polyazoles which is not obtainable in any other way. High molecular weight polyazoles, but especially polybenzimidazoles, are notable for a high molecular weight which, measured as the intrinsic viscosity, is at least 1.8 dl/g, preferably at least 2.0 dl/g, especially preferably at least 2.5 dl/g. The upper limit is preferably not more than 8.0 dl/g, more preferably not more than 6.8 dl/g, especially preferably not more than 6.5 dl/g. The molecular weight is thus well above that of the commercial polybenzimidazole (IV<1.1 dl/g).

The intrinsic viscosity is determined as described below: for this purpose, the polymer is first dried at 160° C. over the course of 2 h. 100 mg of the polymer thus dried are then dissolved in 100 ml of concentrated sulfuric acid (min. 96% by weight) at 80° C. over the course of 4 h. The inherent or intrinsic viscosity is determined from this solution to ISO 3105 (DIN 51562, ASTM D2515) with an Ubbelohde viscometer at a temperature of 25° C.

When the mixture according to step A) also comprises tricarboxylic acids or tetracarboxylic acid, this achieves branching/crosslinking of the polymer formed along the main chain. This contributes to improvement of the mechanical character.

In one variant of the process, heating of the mixture from step A) to temperatures of up to 350° C., preferably up to 280° C., can already bring about the formation of oligomers and/or polymers. Depending on the temperature and duration selected, it is subsequently possible to partially or entirely dispense with the heating in step C). This variant too is suitable for production of the films required for step a), comprising preferably high molecular weight polyazoles.

It has additionally been found that, in the case of use of aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, the favorable temperature in step C)—or if the formation of oligomers and/or polymers is desired as early as in step A)—is in the range of up to 300° C., preferably between 100° C. and 250° C.

The polymer layer obtained in step C) can be treated to produce the film required for step b) in several ways.

In one variant (variant A), the polyphosphoric acid or phosphoric acid present is left in the membrane since it is not disruptive in the further processing. In this case, the polymer layer produced in step C) is treated in the presence of moisture at temperatures and for a duration sufficient for the layer to possess sufficient strength for the intended end use. The treatment can be effected to such an extent that the membrane is self-supporting, such that it can be detached from the support without damage (step E). Steps D) and E) can also be effected simultaneously or in quick succession. In addition, it is possible to combine steps D) and E) with the measures of steps b), c) and optionally d). For example, the hydrolysis in step D) can be effected by treating the polymer film formed in step C) with the solution comprising (i) at least one strong acid and (ii) at least one stabilizing reagent, where the total content of stabilizing reagents in the solution is in the range of 0.01 to 30% by weight. The performance of the stabilization reaction in step c) can be combined with a thermal drying or concentration of the acid present.

The polymer film is treated in step D) at temperatures above 0° C. and less than 150° C., preferably at temperatures between 10° C. and 120° C., especially between room temperature (20° C.) and 90° C., in the presence of moisture or water and/or water vapor and/or water-comprising phosphoric acid of up to 85%. The treatment is effected preferably under standard pressure, but can also be effected under pressure. It is essential that the treatment occurs in the presence of sufficient moisture, as a result of which the polyphosphoric acid present contributes to reinforcement of the polymer film as a result of partial hydrolysis to form low molecular weight polyphosphoric acid and/or phosphoric acid. As a result of the hydrolysis step, a sol-gel transition occurs, which is found to be responsible for the particular form of the membrane.

The partial hydrolysis of the polyphosphoric acid in step D) leads to a reinforcement of the polymer film, such that it becomes self-supporting, and also leads to a decrease in the layer thickness.

The intra- and intermolecular structures present in the polyphosphoric acid layer according to step B) lead, in step C), to ordered membrane formation which is found to be responsible for the good properties of the polymer film formed.

The upper temperature limit of the treatment in step D) is generally 180° C. In the case of extremely brief action of moisture, for example of extremely superheated steam, this vapor may also be hotter. The essential factor for the upper temperature limit is the duration of the treatment.

The partial hydrolysis (step D) can also be effected in climate-controlled chambers in which the hydrolysis can be controlled under defined action of moisture. In this case, the moisture content can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time for the membrane depends on the thickness.

In general, the treatment time is between a few seconds and minutes, for example under the action of superheated steam, or up to whole days, for example under air at room temperature and low relative air humidity. The treatment time is preferably between 10 seconds and 300 hours, especially 1 minute to 200 hours.

When the partial hydrolysis is performed at room temperature (20° C.) with ambient air of relative air humidity of 40-80%, the treatment time is between 1 and 200 hours.

The polymer film obtained in step D) is preferably configured so as to be self-supporting, i.e. it can be detached without damage from the support in step E) and then optionally further processed directly.

To the extent that the polymer film obtained in step C) is further processed on the support, for example to give a composite membrane, it is possible to entirely or partially dispense with step D).

To the extent that the polyphosphoric acid or phosphoric acid present after step C) is left in the membrane (variant A), the treatment of the film in step b) can be performed in a hydrolysis bath analogously to step D). In this case, the polyphosphoric acid or phosphoric acid present in the membrane is replaced completely or at least partially by the solution comprising (i) at least one strong acid and (ii) at least one stabilizing reagent. The stabilization reaction in step c) can be performed in the hydrolysis bath or thereafter, preferably immediately thereafter. According to the stability of the membrane, the treatment in the hydrolysis bath can be effected on a support, or else the support may already have been removed beforehand, such that step E) can optionally be dispensed with or brought forward.

This variant too forms part of the subject matter of the present invention.

In a further variant (variant B), the polyphosphoric acid or phosphoric acid present is removed from the membrane. For this purpose, the polymer layer obtained in step C) is treated in the presence of moisture at temperatures and for a duration sufficient for the layer to have sufficient strength for further handling. Thus, the hydrolysis in step D) and the detachment in step E) can also be effected simultaneously. This simplification of the hydrolysis is possible especially when the polyphosphoric acid or phosphoric acid present is to be removed completely and need not be present for the treatment in step b) since a fresh solution comprising a strong acid is supplied again later in step b).

To the extent that the polyphosphoric acid or phosphoric acid still present in the polymer film is to be removed in step F), this can be accomplished by means of a treatment liquid within the temperature range between room temperature (20° C.) and the boiling temperature of the treatment liquid (at standard pressure).

The treatment liquids used in the context of the invention are solvents which are present in liquid form at room temperature [i.e. 20° C.] and are selected from the group of the alcohols, ketones, alkanes (aliphatic and cycloaliphatic), ethers (aliphatic and cycloaliphatic), glycols, esters, carboxylic acids, where the above group members may be halogenated, water and mixtures thereof.

Preference is given to using C1-C10 alcohols, C2-C5 ketones, C1-C10-alkanes (aliphatic and cycloaliphatic), C2-C6 ethers (aliphatic and cycloaliphatic), C2-C5 esters, C1-C3 carboxylic acids, dichloromethane, water and mixtures thereof.

Subsequently, the treatment liquid introduced in step F) is removed again. This is accomplished preferably by drying, in which case the parameters of temperature and of ambient pressure are selected as a function of the partial vapor pressure of the treatment liquid. Typically, the drying is effected at standard pressure and temperatures between 20° C. and 200° C. Gentler drying can also be effected under reduced pressure. Instead of the drying, it is also possible to dab the membrane dry and hence to free it of excess treatment liquid. The sequence is uncritical.

The film comprising polyazoles can also be produced by means of variation of the above method. In this case, the following steps are carried out:

i) reacting one or more aromatic tetraamino compounds with one or more aromatic carboxylic acids or esters thereof which comprise at least two acid groups per carboxylic acid monomer, or one or more aromatic and/or heteroaromatic diaminocarboxylic acids in the melt at temperatures of up to 350° C., preferably up to 300° C., ii) dissolving the solid prepolymer obtained in step i) in polyphosphoric acid, iii) heating the solution obtainable in step ii) under inert gas to temperatures of up to 300° C., preferably up to 280° C., to form the dissolved polyazole polymer, iv) forming a membrane using the solution of the polyazole polymer according to step iii) on a support and v) treating the membrane formed in step iv) until it is self-supporting.

In addition to the above variation, the formation can also by the following steps:

I) dissolving polymers, especially polyazoles, in polyphosphoric acid,

II) heating the solution obtainable in step I) under inert gas to temperatures of up to 400° C., III) forming a membrane using the solution of the polymer according to step II) on a support and IV) treating the membrane formed in step III) until it is self-supporting.

In both variations, step v) or IV) is followed by steps E) and F), for which both variants A) and B) are also possible.

The preferred embodiments of the particular raw materials and process parameters are already specified for steps A), B), C) and D) and are also valid for this variant.

Film Comprising Polyazoles and Further Blend Components

In addition to the aforementioned preferably high molecular weight polyazole, it is also possible to use a blend of one or more preferably high molecular weight polyazoles with a further polymer. The blend component essentially has the task of improving the mechanical properties and of reducing the material costs. A preferred blend component is polyether sulfone as described in German patent application No. 10052242.4.

The preferred polymers which can be used as blend components include polyolefins such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitrosomethane, with sulfonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, especially those of norbornene;

polymers having C—O bonds in the backbone, for example polyacetal, polyoxymethylene, polyethers, polypropylene oxide, polyepichlorohydrin, polytetrahydrofuran, polyphenylene oxide, polyether ketone, polyesters, especially polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the backbone, for example polysulfide ethers, polyphenylene sulfide, polyether sulfone;

polymers having C—N bonds in the backbone, for example polyimines, polyisocyanides, polyetherimine, polyaniline, polyamides, polyhydrazides, polyurethanes, polyimides, polyazoles, polyazines;

liquid-crystalline polymers, especially Vectra, and inorganic polymers, for example polysilanes, polycarbosilanes, polysiloxanes, polysilicic acid, polysilicates, silicones, polyphosphazenes and polythiazyl.

For use in fuel cells with a sustained use temperature above 100° C., preference is given to those blend polymers which have a glass transition temperature or Vicat softening temperature VST/A/50 of at least 100° C., preferably at least 150° C. and most preferably at least 180° C. Preference is given here to polysulfones with a Vicat softening temperature VST/A/50 of 180° C. to 230° C.

The preferred polymers include polysulfones, especially polysulfone with aromatic rings in the backbone. In a particular aspect of the present invention, preferred polysulfones and polyether sulfones have a melt volume flow rate MVR 300/21.6 less than or equal to 40 cm$^3$/10 min, especially less than or equal to 30 cm$^3$/10 min and more preferably less than or equal to 20 cm$^3$/10 min, measured to ISO 1133.

Film Comprising Polyazoles and Further Additives

To further improve the later performance properties, further fillers, especially proton-conducting fillers, can be added to the preferably high molecular weight polyazole film or to the acid-containing polyazole membrane.

Nonlimiting examples of proton-conducting fillers are
sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$ silicates such as zeolites, zeolites ($NH_4+$), sheet silicates, framework silicates, H-natrolite, H-mordenite, $NH_4$-analcine, $NH_4$-sodalite, $NH_4$-gallate, H-montmorillonite, other condensation products of orthosalicic acid $Si(OH)_4$ and the salts and esters thereof, polysiloxanes of the general formula $H_3Si—(O—SiH_2—)_n—O—SiH_3$, and especially also other clay minerals, such as montmorrilonites, bentonites, kaolinites, pyrophillites, talc, chlorites, muscovites, mica, smectites, halosites, vermiculites and hydrotalcites.

acids such as $HClO_4$, $SbF_5$ fillers such as carbides, especially SiC, $Si_3N_4$, fibers, especially glass fibers, glass powders and/or polymer fibers, preferably based on polyazoles, also partly crosslinked.

These additives may be present in the proton-conducting polymer membrane in customary amounts, although the positive properties, such as high conductivity, high lifetime and high mechanical stability of the membrane should not be impaired too significantly by addition of excessively large amounts of additives. In general, the membrane comprises at most 80% by weight, preferably at most 50% by weight and more preferably at most 20% by weight of additives. The additives may be present in different particle forms and particle sizes, or else mixtures, but more preferably in the form of nanoparticles.

Stabilizing Solution and Reaction

The film comprising preferably high molecular weight polyazoles is treated in step b) with a solution comprising (i) at least one strong acid and (ii) at least one stabilizing reagent.

Said stabilizing reagent comprises at least one compound which has

A) at least one aldehyde group and at least one hydroxyl group or

B) at least one hemiacetal group or

C) at least one acetal group.

Suitable stabilizing reagents include, in this context, especially all compounds which are capable of mechanically stabilizing the preferably high molecular weight polyazole. They comprise preferably 2 to 60, more preferably 3 to 40 and especially 4 to 20 carbon atoms.

The organic compounds used as stabilizing reagents must have a sufficient stability to the strong acid present in the solution. In addition, they must have a sufficient solubility in the strong acid, such that the total content of stabilizing reagents in the solution in step b) is appropriately in the range from 0.01 to 20% by weight, preferably 0.1 to 15% by weight, more preferably 0.25 to 10% by weight, especially 1 to 5% by weight. To the extent that the stabilizing reagents do not have a sufficient solubility in the strong acid, it is also possible to add small amounts of further inert solubilizers.

Overall, the solubility should appropriately, however, be sufficient for the solution in step b) to be capable of enabling a total content of stabilizing reagent in the range from 0.01 to 100 mol % of the reagent—based on the polyazole present in the film (per repeat unit of the polyazole polymer)—preferably 10 to 80 mol %, especially 15 to 65 mol %.

When the proportion of stabilizing reagent selected is too low, the mechanical strength of the polymer membrane is not sufficiently improved; when the proportion selected is too high, the membrane becomes brittle and the profile of properties of the membrane is inadequate.

In addition, incorporation of the electrolyte into the crosslinking reaction is possible. The stabilizing reagent may partly or fully react or interact with the electrolyte. This reaction or interaction likewise results in mechanical and/or chemical stabilization of the membrane, and also stabilization with respect to the phosphoric acid environment. Incorporation of the electrolyte into the stabilizing reaction can lead here to a lowering of the acid strength.

The proton conductivity of the stabilized membranes at 160° C. is appropriately between 30 and 220 mS/cm, preferably at least 40-200 mS/cm, more preferably between 50 and 200 mS/cm.

The proton conductivities are measured by means of impedance spectroscopy (Zahner IM5 or IM6 spectrometer) and a 4-point test cell. A particular procedure is as follows.

For sample preparation, pieces of approx. 3.5*7 cm in size are appropriately cut out, and the membrane samples are rolled a total of 10 times with a roller-shaped weight of 500 g, in order to remove excess acid. The thickness of the samples is favorably determined at 3 points with a Mitutoyo "Absolute, Digmatic" thickness measuring instrument, and averaged (start, middle and end of the sample strip). The sample is appropriately fixed in the test cell as shown in FIG. 1.

The numerals denote:
(1): $I_-$
(3): $U_+$
(5): $U_-$
(7): $I_+$
(9): connector
(11): Pt wire
(13): seal
(15): membrane
(17): Pt plate The screws of the test cell are preferably tightened by hand and the cell is favorably transferred into a controlled oven which runs through a temperature-frequency program according to Table 1.

TABLE 1

| | | |
|---|---|---|
| Frequency range | Lowest frequency (lower limit) | 1 Hz |
| | Highest frequency (upper limit) | 100 kHz |
| | Start frequency (frequency at the start) | 10 kHz |
| Stages per decade | Above 66 Hz | 20 |
| | Below 66 Hz | 5 |
| Number of test periods | Above 66 Hz | 10 |
| | Below 66 Hz | 4 |

The oven program is started, and impedance spectra are measured with a Zahner-Elektrik IM6 impedance spectrometer with a 4-point dry test cell at 20° C. to 160° C. and—in reverse—from 160° C. to 20° C., preferably in 20° C. steps, favorably with a hold time of 10 min before the measurement. The spectrum is saved and preferably evaluated by the literature method of Bode and Niquist. The proton conductivity is calculated here by:

$$\sigma = \frac{1}{R \cdot b \cdot d} \left[ \frac{S}{cm} \right]$$

l (distance between the contacts)=2 cm, b (membrane width)=3.5 cm, d=membrane thickness (cm), R=resistance measured (ohms)

The preferred stabilizing reagents include especially aldehydes having at least one hydroxyl group, preferably at least two, more preferably at least three, even more preferably at least four and especially at least five hydroxyl groups, where the compounds may also be present as a ring as a result of intramolecular bond formation of the carbonyl group with a hydroxyl group.

Particular preference is further given to compounds having two to ten, preferably three to nine, more preferably four to eight, even more preferably five to seven and especially 6 carbon atoms.

Preference is further given to condensates of those compounds which can be obtained by elimination of water.

Very particularly advantageous is the use of monosaccharides, oligosaccharides and polysaccharides, especially of monosaccharides, disaccharides and trisaccharides.

Particularly suitable monosaccharides satisfy the formula $C_nH_{2n}O_n$, where n is 3, 4, 5 or 6, preferably 4, 5 or 6, favorably 5 or 6 and more preferably 6, and comprise especially D-glyceraldehyde, L-glyceraldehyde, D-erythrose, L-erythrose, D-threose, L-threose, D-ribose, D-arabinose, D-xylose, D-lyxose, L-ribose, L-arabinose, L-xylose, L-lyxose, D-allose, D-altrose, D-glucose, D-mannose, D-gulose, D-idose, D-galactose, D-talose, L-allose, L-altrose, L-glucose, L-mannose, L-gulose, L-idose, L-galactose and L-talose.

Particularly suitable disaccharides satisfy the formula $C_{12}H_{22}O_{11}$ and comprise especially cane sugar (sucrose, α-D-glucopyranosyl-β-D-fructofuranoside), milk sugar (lactose, 4-O-(β-D-galactopyranosyl)-D-glucopyranose), trelose (α-D-glucopyranosyl-α-D-glucopyranoside), maltose (malt sugar, 4-O-(α-D-glucopyranosyl)-D-glucopyranose), cellobiose (4-O-(β-D-glucopyranosyl)-D-glucopyranose), gentiobiose (6-O-(β-D-glucopyranosyl)-D-glucopyranose) and melibiose (6-O-(α-D-galactopyranosyl)-D-glucopyranose).

Particularly suitable trisaccharides satisfy the formula $C_{18}H_{32}O_{16}$ and comprise especially raffinose (6-O-(α-D-galactopyranosyl)-D-glucopyranyl-β-D-fructofuranoside), gentianose (β-D-fructofuranosyl-β-D-glucopyranosyl-(1→6)-α-D-glucopyranoside) and melezitose (O-α-D-glucopyranosyl-(→3)-O-β-D-fructofuranosyl-(2→)-α-D-glucopyranoside).

Stabilization is effected by heating, appropriately under inert gas, to a temperature greater than 60° C., preferably to a temperature in the range from greater than 80° C. to 200° C., especially to a temperature in the range from 80° C. to 180° C., favorably for a period of 5 minutes to 120 minutes, preferably 5 minutes to 30 minutes, more preferably 10 minutes. Optionally, the stabilized film can be postconditioned at temperatures of 20° C. to 80° C., more preferably 60° C., in an acid-containing solution for 10 minutes to 12 hours.

The strong acid used in accordance with the invention is aprotic acid, preferably phosphoric acid and/or sulfuric acid.

In the context of the present description, "phosphoric acid" is understood to mean polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid and derivatives, especially organic derivatives, such as cyclic organophosphoric acids, and derivatives thereof, such as acid esters. The phosphoric acid, especially orthophosphoric acid, preferably has a concentration of at least 80 percent by weight, more preferably a concentration of at least 90 percent by weight, even more preferably a concentration of at least 95 percent by weight and most preferably a concentration of at least 98 percent by weight, the concentration figures being based on the effective concentration of the acid in the membrane or in the hydrolysis.

For further adjustment for the later use, the stabilization in step c) may be followed by additional doping of the membrane. In this case, the additives mentioned at the outset can be added, or else the degree of doping can be effected by further addition of the strong acids mentioned. In addition, water present can be withdrawn from the membrane, for example by concentrating the strong acid present. It is possible to add catalysts required in addition for a stabilization reaction and mixtures of different stabilizing agents of the abovementioned groups.

The inventive acid-containing polyazole membrane based on stabilized, preferably high molecular weight polyazole polymers forms an acid-based complex with the acid, and is therefore proton-conducting even without the presence of water. This mechanism, called the Grotthus conductivity mechanism, enables use in high-temperature fuel cells with a sustained operating temperature of at least 120° C., preferably at least 140° C., especially at least 160° C. The inventive membrane can therefore be used as an electrolyte for electrochemical cells, especially fuel cells.

The inventive acid-containing polyazole membrane based on stabilized, preferably high molecular weight polyazole polymers is notable for improved mechanical properties. For instance, an inventive membrane exhibits a modulus of elasticity of at least 3 MPa, appropriately of at least 4 MPa, preferably of at least 5 MPa, more preferably of at least 6 MPa, desirably of at least 7 MPa, especially of at least 8 MPa. In addition, the inventive membranes exhibit an elongation at break of at least 150%, preferably of at least 200%, especially of at least 250%.

The tensile strain properties are preferably determined with a Zwick Z010 standard tensile tester, and the procedure which follows has been found to be useful. The samples are first cut appropriately into strips of width 1.5 cm and length 12 cm. Preferably 2-3 samples are prepared and analyzed per sample, and the results are then averaged. The thickness of the samples is preferably determined with a Mitutoyo Absolute Digmatic thickness measuring instrument at 3 points and averaged (preferably at the start, middle and end of the strip). The measurement is preferably carried out as follows. The sample strip is clamped and held at an initial force of 0.1 N for 1 min. Subsequently, the measurement is carried out automatically at a pulling speed of preferably 5 mm/min, preferably at RT, until the modulus of elasticity (MPa) has been determined (automatic procedure by means of the Zwick Software TextExpert (Version 11). Thereafter, measurement is continued with a pulling speed of preferably 30 mm/min until the sample strip tears. After the measurement has ended, the fracture toughness ($kJ/m^2$) and the elongation at break (%) are determined.

The conductivity of the inventive acid-containing polyazole membranes based on stabilized, preferably high molecular weight polyazole polymers is preferably at least 50 mS/cm, more preferably at least 100 mS/cm, especially at least 150 mS/cm.

The inventive acid-containing polyazole membranes based on stabilized, preferably high molecular weight polyazole polymers are additionally notable for an increased stability in the case of use as a proton-conducting membrane in high-temperature fuel cells. In the case of operation of such systems, it has been found that, especially in the case of phosphoric acid systems, the stability of the acid-containing polyazole membranes should be improved further. The inventive membranes are notable for such an improved stability and are preferably insoluble in 99% phosphoric acid over the temperature range from 85° C. to 180° C. In this context, "insoluble" means that swelling does not exceed 300% and no dissolution of the self-supporting film occurs in an excess of the acid present.

In addition, the inventive acid-containing polyazole membranes based on stabilized, preferably high molecular weight polyazole polymers have improved compressibility. The relative decrease in membrane thickness is typically less than 40% at 160° C., 120 min according to the Weiser Imprint Test, compared to approx. 80% relative decrease in membrane thickness for a corresponding unstabilized membrane under the same conditions. The Weiser Imprint Test for determination of compressibility is appropriately conducted as follows: To determine the characteristic membrane pressure performance, membrane samples with an area of 4.91 cm$^2$ (diameter 2.5 cm) are punched out and placed on a hotplate with a Kapton film as a substrate. A metal die guided by metal guides and having three studs (d=1 mm) is placed onto the membrane sample, and the decrease in thickness of the membrane sample is recorded with a Mitutoyo DC III thickness measuring instrument at a hotplate temperature of 160° C. over the course of 120 minutes. The thicknesses measured are normalized to the starting thickness and plotted as a graph against time.

The inventive stabilized membranes are additionally notable for an improved long-term stability.

Additional applications also include use as an electrolyte for a display element, an electrochromic element or various sensors.

The present invention further provides for the preferred use of the inventive polymer electrolyte membrane in a single cell (MEA) for a fuel cell.

The single cell for a fuel cell comprises at least one inventive membrane and two electrodes, between which the proton-conducting membrane is arranged in a sandwich-manner.

The electrodes each have a catalytically active layer and a gas diffusion layer for supplying a reaction gas to the catalytically active layer. The gas diffusion layer is porous, in order that reactive gas can pass through it.

The inventive polymer electrolyte membrane can be used as an electrolyte membrane. It is also possible to produce the electrolyte membrane and a precursor for a single cell (MEA) with one or both catalytically active layers. In addition, the single cell can also be produced by fixing the gas diffusion layer on the precursor.

The present invention further provides a fuel cell comprising a plurality of single cells (MEUs), each of which comprises a membrane produced by the above process and two electrodes, between which the membrane is arranged in a sandwich-like manner.

The inventive stabilization can also be performed after production of an MEA from a membrane. For this purpose, doping of the membrane with the stabilizing agent takes place as described above. The stabilization reaction in step c) or the activation of the stabilizing component, however, takes place subsequently within the MEA arranged in the manner of a sandwich.

More preferably, the stabilization takes place at a temperature in the range from 60° C. to 250° C., especially in the range from 80° C. to 180° C. The reaction time is from a few minutes up to several hours, according to the reactivity of the reagent. The stabilization reaction in a MEA can be performed in one or more stages (temperature ramp).

The invention is illustrated further hereinafter by several examples, without any intention that this should impose a restriction of the inventive concept.

EXAMPLE 1

Performance of an Inventive Stabilization a) Preparation of the Solution Comprising the Stabilizing Agent:

Example: Stabilizing Solution Based on Alpha-D-Glucose

A 2.0% by wt. solution of alpha-D-glucose (anhydrous, manufacturer: Aldrich, Cat.: 15,896-8) in 50% phosphoric acid (for example Sigma-Aldrich) is prepared. For this purpose, 980 g of the phosphoric acid are initially charged in a 3000 ml beaker and provided with a stirrer bar. 20.00 g of alpha-D-glucose are added and dissolved while stirring at 60-120° C.

b) Example for the Performance of the Stabilization of the Membrane

The solution from a) is introduced into a thermally stable dish (for example glass or porcelain). A piece of approx. DIN A4 size from a standard Celtec-P membrane (polyazole-based, phosphoric acid-containing film, manufacturer: e.g. BASF Fuel Cell Inc., Somerset, N.J.)) is placed into the solution. The membrane has to be completely covered by the solution. The dish is covered with a glass plate and treated in a preheated drying cabinet at T=120-160° C. overnight (approx. 8 h). The residence time in the dish serves for exchange of the solvent/introduction of the stabilizing agent into the membrane by means of diffusion (solvent exchange). The dish is then removed from the drying cabinet. The membrane is removed from the solution and the excess solvent is cautiously allowed to drip off. The excess of solvent can also be removed by cautious dabbing with a nonwoven cloth or a squeegee. The membrane is divided into 3 parts and one part is retained (sample b1).

A further part of the membrane thus obtained is sealed into a PE/aluminum pouch (exclusion of air) and treated in a heating cabinet preheated to T=160° C. for 2 h. The sample can be stored in the pouch with sealing in the pouch until further use (sample b2).

The last third of the treated membrane is placed onto a glass plate and smoothed. Subsequently, the membrane on the glass plate is treated in a heating cabinet at 160° C. for 2 h and a vacuum is applied (drying cabinet reading approx. 100 mbar). After the conditioning, the membrane is placed into a bath containing 50% phosphoric acid, and has to be completely covered by the acid. The membrane is treated in the acid overnight (approx. 8 h), then removed and allowed to drip dry, and excess acid is removed cautiously with a nonwoven cloth or squeegee (sample b3).

c) Testing of Stability in Phosphoric Acid

To examine stability, one piece (approx. 2*2 cm) of each of the membranes b1), b2) and b3) obtained under c) is introduced into an excess (40 ml) of 99% phosphoric acid (Sigma-Aldrich) in a 100 ml beaker and covered by means of a watchglass.

According to the purity, this may be solid. Should it be solid, the solid is treated at 80° C. in a heating cabinet overnight (approx. 8 hours). The acid is then free-flowing and does not precipitate out again even in the course of cooling.

The membrane piece is heated to 160° C. in the beaker and the stability of the membrane is assessed.

The unstabilized heat-treated sample b1) has the following properties:
completely dissolved after approx. 60 minutes
physical properties not measurable (solution)

The stabilized sample b2) has the following properties:
mechanical integrity of the film maintained (t>6 h no dissolution)
physical properties not determined since film after t>6 h still very soft The stabilized sample b3) has the following properties;
mechanical integrity of the film maintained (t>8 h no dissolution)
the properties of the stabilized membrane are compared with those of a standard Celtec-P membrane in Tables 1 and 2.

TABLE 1

Direct comparison of the physical properties of a standard Celtec P membrane (CD 348) with a membrane stabilized in accordance with the invention according to b3).

| Membrane | Standard Celtec-P | Stabilized membrane according to b3) |
| --- | --- | --- |
| Stabilizer | No stabilizer | α-D-glucose |
| Amount of stabilizer [% by wt.] | 0 | 2.0 |
| Thickness [μm] | 350.0 | 365.0 |
| Moduli of elasticity [MPa] | 3.6 | 5.0 |
| $M(H_3PO_4)$ | 52.3 | 76.7 |
| Solids content [% by wt.] | 5.0 | 9.9 |
| Acid per unit area [mg/cm$^2$] | 25.0 | 44.9 |
| Proton conductivity [mS/cm] | approx. 100 | >100 |

TABLE 2

Comparison of the relative decreases in thickness of a membrane stabilized in accordance with the invention according to b3) with a standard Celtec-P membrane (in the Weiser imprint test)

| Membrane | Standard Celtec-P | Stabilized membrane according to b3) |
| --- | --- | --- |
| Rel. decrease in thickness 30 min [%] | 74 | 28 |
| Rel. decrease in thickness 120 min [%] | 88 | 32 |

*Rel. decrease in thickness calculated according to: rel. decrease in thickness = $((d_{start} - d_t)/d_{start}) * 100$
where
$d_{start}$: thickness at the start
$d_t$: thickness at time t

The invention claimed is:

1. A process for preparing mechanically stabilized polyazole polymers which comprises the following steps:
   a) producing a film comprising polyazoles with at least one amino group in a repeat unit,
   b) treating the film from step a) with a solution comprising (i) at least one strong acid and (ii) at least one stabilizing reagent, the total content of stabilizing reagents in the solution being in the range from 0.01 to 30% by weight,
   c) performing the stabilization reaction in the membrane obtained in step b) directly or in a subsequent membrane processing step by heating to a temperature greater than 60° C.,
   d) optionally additionally doping the membrane obtained in step c) with a strong acid or concentrating the strong acid present by removing water present,
   said stabilizing reagent comprising at least one compound which has
   A) at least one aldehyde group and at least one hydroxyl group or
   B) at least one hemiacetal group or
   C) at least one acetal group.

2. The process according to claim 1, wherein the polyazole has a molecular weight (measured as the intrinsic viscosity) of at least 1.8 dl/g.

3. The process according to claim 1, wherein the solution in step b) comprises at least one strong protic acid.

4. The process according to claim 3, wherein the strong protic acid is based on phosphoric acid and/or sulfuric acid.

5. The process according to claim 4, wherein the phosphoric acid comprises polyphosphoric acid, phosphonic acid (H3PO3), orthophosphoric acid (H3PO4), pyrophosphoric acid (H4P2O7), triphosphoric acid (H5P3O10), metaphosphoric acid or derivatives thereof.

6. The process according to claim 4, wherein the phosphoric acid comprises cyclic organophosphoric acids, and derivatives thereof.

7. The process according to claim 1, wherein the stabilizing reagent used is at least one monosaccharide, oligosaccharide or polysaccharide.

8. The process according to claim 5, wherein the stabilizing reagent used is at least one monosaccharide, disaccharide or trisaccharide.

9. The process according to claim 6, wherein the stabilizing reagent used is D glyceraldehyde, L-glyceraldehyde, D-erythrose, L-erythrose, D-threose, L threose, D-ribose, D-arabinose, D-xylose, D-lyxose, L-ribose, L-arabinose, L xylose, L-lyxose, D-allose, D-altrose, D-glucose, D-mannose, D-gulose, D idose, D-galactose, D talose, L-allose, L-altrose, L-glucose, L-mannose, L gulose, L-idose, L-galactose, L-talose, cane sugar, milk sugar, trelose, maltose, cellobiose, gentiobiose, melibiose, raffinose, gentianose or melezitose or a mixture thereof.

10. The process according to claim 1, wherein the resulting membrane has a modulus of elasticity of at least 3 MPa.

11. A membrane obtainable by the process according to claim 2.

12. The membrane according to claim 11, which has a solubility of less than 0.5% by weight of polyazole polymer in 99% phosphoric acid over the temperature range from 85° C. to 120° C.

13. A process for production of a membrane electrode assembly which comprises utilizing the membrane according to claim 11.

14. A membrane electrode assembly comprising at least one membrane according to claim 11.

15. A for production of a fuel cell which comprises utilizing the membrane electrode assembly according to claim 14.

16. A fuel cell comprising at least one membrane electrode assembly according to claim 14.

* * * * *